*(12)* United States Patent
Montgomery et al.

(10) Patent No.: US 8,250,354 B2
(45) Date of Patent: Aug. 21, 2012

(54) METHOD AND APPARATUS FOR MAKING A PROCESSOR SIDEBAND INTERFACE ADHERE TO SECURE MODE RESTRICTIONS

(75) Inventors: Wallace Paul Montgomery, Austin, TX (US); Andrew Lueck, Austin, TX (US); Geoffrey S. S. Strongin, Austin, TX (US)

(73) Assignee: Globalfoundries, Inc., Grand Cayman (KY)

( * ) Notice: Subject to any disclaimer, the term of this patent is extended or adjusted under 35 U.S.C. 154(b) by 955 days.

(21) Appl. No.: 12/208,071

(22) Filed: Sep. 10, 2008

(65) Prior Publication Data

US 2009/0144472 A1    Jun. 4, 2009

Related U.S. Application Data

(60) Provisional application No. 60/991,045, filed on Nov. 29, 2007.

(51) Int. Cl.
*G06F 15/177* (2006.01)
(52) U.S. Cl. ............................................. 713/2; 726/27
(58) Field of Classification Search .............. 726/26–27; 713/1–2; 711/163
See application file for complete search history.

(56) References Cited

U.S. PATENT DOCUMENTS

| | | | |
|---|---|---|---|
| 5,530,804 A | 6/1996 | Edgington et al. | |
| 5,802,359 A | 9/1998 | Webb et al. | |
| 5,958,037 A | 9/1999 | Dreyer et al. | |
| 6,263,441 B1 * | 7/2001 | Cromer et al. | 726/35 |
| 6,453,344 B1 | 9/2002 | Ellsworthy et al. | |
| 6,473,825 B1 * | 10/2002 | Worley et al. | 710/306 |
| 6,735,660 B1 | 5/2004 | Osten et al. | |
| 6,981,083 B2 | 12/2005 | Arimilli et al. | |
| 7,210,131 B2 | 4/2007 | Schmidt et al. | |
| 7,313,730 B1 * | 12/2007 | Ryser | 714/30 |
| 7,711,990 B1 | 5/2010 | Nickolls et al. | |
| 7,752,428 B2 * | 7/2010 | Datta et al. | 713/2 |
| 7,831,816 B2 | 11/2010 | Montgomery et al. | |
| 2003/0056115 A1 * | 3/2003 | Falkenberg | 713/201 |
| 2003/0097602 A1 | 5/2003 | Bigbee et al. | |
| 2004/0153762 A1 | 8/2004 | Flynn et al. | |
| 2004/0162989 A1 | 8/2004 | Kirovski | |
| 2004/0210760 A1 | 10/2004 | McGrath et al. | |
| 2004/0210764 A1 * | 10/2004 | McGrath et al. | 713/200 |
| 2005/0055524 A1 | 3/2005 | Gulick et al. | |

(Continued)

OTHER PUBLICATIONS

"Intelligent Platform Management Interface Specification Second Generation v2.0" [Online], Feb. 12, 2004 [Retrieved Oct. 1 2011], Intel [www.intel.com], Document Revision 1.0 [Retrieved from: http://download.intel.com/design/servers/ipmi/IPMIv2_0rev1_0.pdf].*

(Continued)

*Primary Examiner* — Aravind Moorthy
*Assistant Examiner* — Eric W Shepperd
(74) *Attorney, Agent, or Firm* — Zagorin O'Brien Graham LLP (57) ABSTRACT

In response to entering a secure mode a processor disables access to first predetermined processor information through a sideband interface, while maintaining access to second predetermined processor information through the sideband interface. In the processor, a first interface portion of the sideband interface may provide access to the first predetermined processor information and a second interface portion of the sideband interface may provide access to the second predetermined processor information. The first interface portion is enabled in response to a power-on sequence and is selectably enabled under software control after being disabled on entering the secure mode. The second and additional interface portions may provide access to information related to processor temperature, power management, or machine checks.

22 Claims, 4 Drawing Sheets

U.S. PATENT DOCUMENTS

| | | | |
|---|---|---|---|
| 2006/0253749 | A1 | 11/2006 | Alderegula et al. |
| 2007/0192604 | A1* | 8/2007 | Chiasson et al. ............... 713/170 |
| 2008/0022052 | A1 | 1/2008 | Sakugawa |
| 2008/0046695 | A1 | 2/2008 | Ishizuka et al. |
| 2009/0055637 | A1* | 2/2009 | Holm et al. ........................ 713/1 |
| 2009/0063799 | A1* | 3/2009 | Berenbaum et al. ........... 711/163 |
| 2009/0144332 | A1 | 6/2009 | Montgomery |

OTHER PUBLICATIONS

U.S. Appl. No. 11/947,330, filed Nov. 29, 2007, entitled "Sideband Access Based Method and Apparatus for Determining Software Integrity," naming inventor Wallace Paul Montgomery.

Zhuo, Haihong et al., "Remote Management with the Baseboard Management Controller in Eighth-Generation Dell PowerEdge Servers," Dell Power Solutions, Oct. 2004, pp. 26-29 (4 pages).

INTEL Datasheet, "System Management Feature Specifications," Dual-Core Intel® Itanium® Processor 9000 and 9100 Series Datasheet, Sec. 6, Oct. 2007, pp. 79-90 (14 pages).

INTEL Datasheet, "System Management Feature Specifications," Intel® Itanium® Processor at 800 MHz and 733 MHz Datasheet, Sec. 6, Aug. 2001, pp. 6-1 to 6-12 (14 pages).

U.S. Appl. No. 12/130,990, filed May 30, 2008, entitled "Non-Destructive Sideband Reading of Processor State Information," naming inventors Wallace Paul Montgomery, David F. Tobias, and Michael T. Clark.

Non-Final Office Action mailed Mar. 3, 2011 in U.S. Appl. No. 11/947,330, 8 pages.

AMD "CPUID Specification," Advanced Micro Devices Publication #25481, Revision 2.26, Jul. 2007 (26 pages).

* cited by examiner

FIG. 6

METHOD AND APPARATUS FOR MAKING A PROCESSOR SIDEBAND INTERFACE ADHERE TO SECURE MODE RESTRICTIONS

CROSS-REFERENCE TO RELATED APPLICATION(S)

This application claims benefit under 35 U.S.C. §119(e) of U.S. Provisional Application No. 60/991,045, filed Nov. 29, 2007, entitled "Method and Apparatus for Making a Processor Sideband Interface Adhere to Secure Mode Restrictions," and naming as inventors Wallace Paul Montgomery, Andrew Lueck, and Geoffrey S. Strongin, which application is incorporated by reference herein in its entirety.

BACKGROUND

1. Field of the Invention

This application relates to processor interfaces and more particularly to allowing appropriate security models to be utilized in conjunction with processor interfaces.

2. Description of the Related Art

The information technology (IT) industry is placing increasing importance on security issues in computer systems. Additionally, system management is becoming increasingly important.

Computer systems have historically had a sideband interface, e.g., a debug interface, separate from the main processor interface(s), that provides access to detailed system state information, through e.g., a Joint Test Action Group (JTAG) interface. However, security policies in prior art systems did not address such sideband interfaces.

SUMMARY

Accordingly, an embodiment of the invention allows security based policy decisions to enable or disable processor sideband interfaces to foster a proper security model during processor operation. That allows the use of sideband interfaces to perform advanced manageability and reliability, accessibility and serviceability (RAS) functionality during software runtime. Without a proper security model in place, the presence of an enabled sideband interface may cause a security hole to exist during runtime.

In an embodiment, a method is provided that includes disabling access to first predetermined processor information through a sideband interface in response to entering a secure mode in a processor, while maintaining access to second predetermined processor information through the sideband interface. The method may further include, responsive to entering the secure mode in the processor, disabling a first interface portion of the sideband interface providing access to the first predetermined processor information, while maintaining access through a second interface portion of the sideband interface to the second predetermined processor information. In an embodiment the method may further include software specifying the first predetermined processor information to which access is disabled responsive to entering the secure mode.

The method may further include enabling the first interface portion of the sideband interface in response to a power-on sequence. The method may further include selectably enabling the first interface portion under software control after entering the secure mode. The second interface portion may be maintained enabled, thus providing access to the second predetermined processor information, at least in part, by allowing one or more registers containing temperature related information to be read over the sideband interface. The method may include maintaining at least a third interface portion of the sideband interface enabled while the first interface portion is disabled. The third interface portion may be maintained enabled by allowing one or more registers containing power management related information to be read over the sideband interface in response to a command received over the sideband interface.

In another embodiment, a processor is provided that includes a sideband interface. The processor is configured, responsive to entering a secure mode, to disable access to first predetermined processor information through the sideband interface, while maintaining access to second predetermined processor information through the sideband interface. In an embodiment the sideband interface includes a plurality of interface portions including at least a first and a second interface portion, the first interface portion providing access to the first predetermined processor information and the second interface portion providing access to the second predetermined processor information. The second interface portion may provide access to processor temperature information and the first interface portion may provide access to other processor state information.

BRIEF DESCRIPTION OF THE DRAWINGS

The present invention may be better understood, and its numerous objects, features, and advantages made apparent to those skilled in the art by referencing the accompanying drawings.

Note that the use of the same reference symbols in different drawings indicates similar or identical items.

DESCRIPTION OF THE PREFERRED EMBODIMENT(S)

Figure 1:
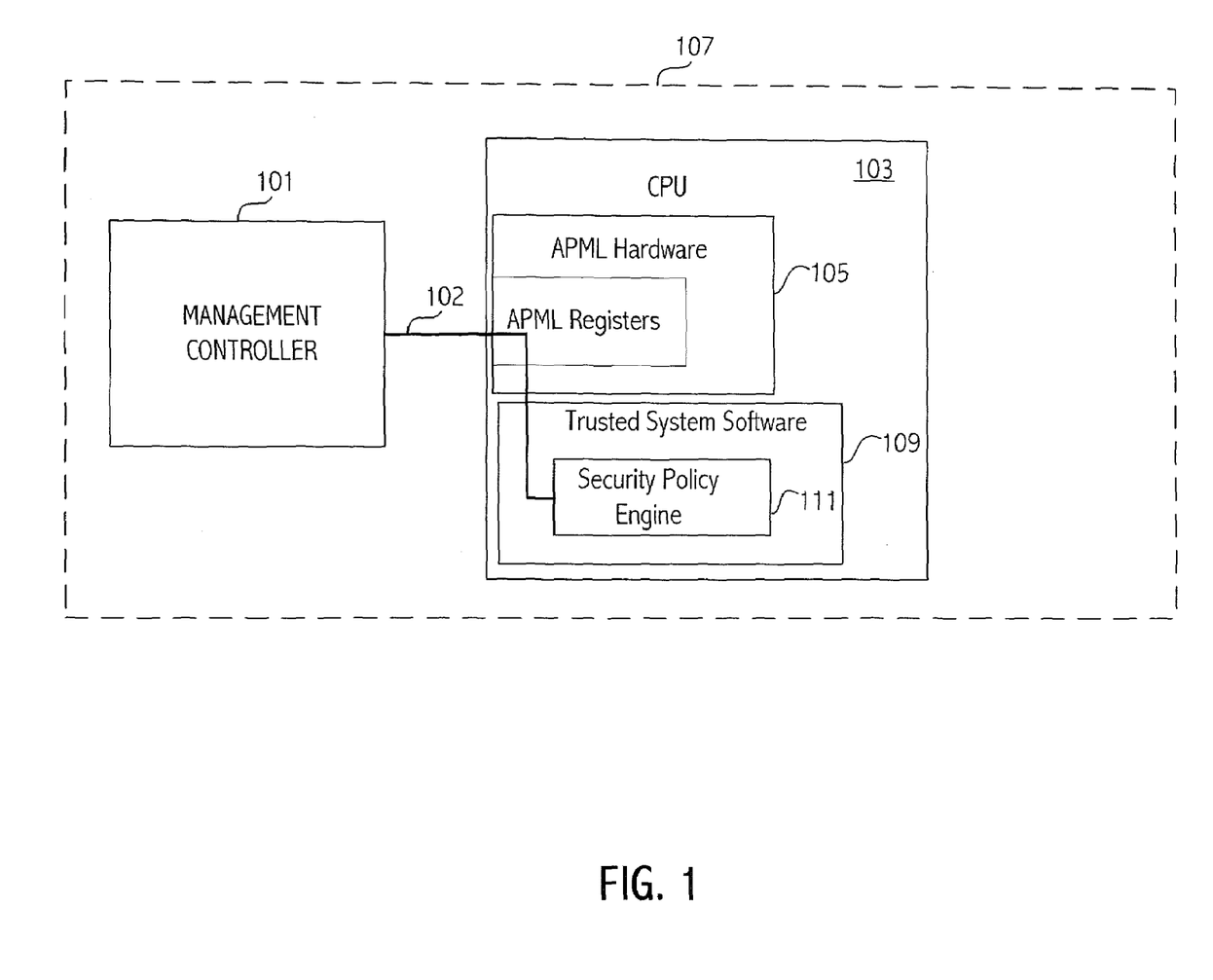
FIG. 1 illustrates a high level block diagram of an exemplary computer system according to an embodiment of the invention.

Referring to FIG. 1, illustrated is a high level block diagram of an exemplary computer system according to an embodiment of the invention. A management controller 101 includes appropriate software/firmware to communicate with processor 103 and perform appropriate management functions. One type of system management controller is known in the art as a baseboard management controller (BMC). BMCs are microcontrollers typically residing on the motherboard of servers, and are coupled to various system sensors. The BMC manages such system functions as temperature, fan speed, power, etc. The BMC provides an interface between system management software and platform hardware. However, in traditional BMC architectures there has been no full processor state access capability. Processor state typically refers to at least the processor registers and may more broadly refer to processor registers, memory, and I/O access.

In contrast, as shown in FIG. 1, the system management controller, according to an embodiment of the invention, includes a communication link 102 directly connecting the management controller 101 to processor 103 that provides access to processor state information. In an embodiment, the communication link 102 is an Advanced Platform Management Link (APML) described in more detail herein. The system management controller provides advanced manageability and reliability, accessibility and serviceability (RAS) functionality before, during, and after software runtime for managed system 107. The processor 103 includes APML hardware 105 to provide an appropriate link interface and registers for communication with the management controller 101. The trusted system software 109 includes a security policy engine 111 that can implement an appropriate security policy for the APML interface in conjunction with hardware control as described further herein.

Figure 2:
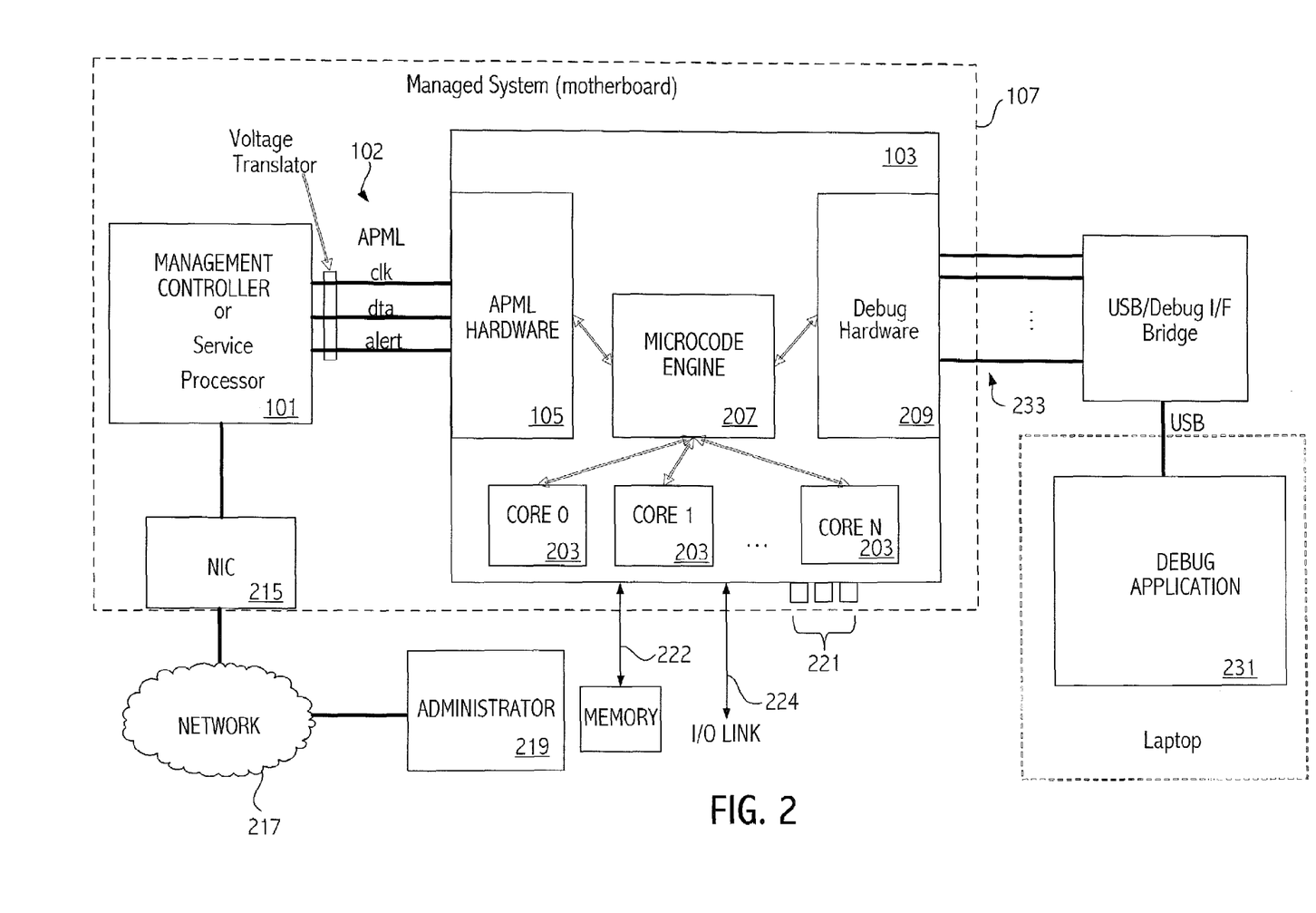
FIG. 2 illustrates additional details of an exemplary system.

Referring now to FIG. 2, an embodiment of the invention is shown in greater detail. The management controller or service processor 101 is coupled via the Advanced Performance Management Link (APML) 102 to a processor 103. Processor 103 includes multiple cores 203. APML processor 103 includes APML hardware 105, microcode engine 207 and debug hardware 209.

In an embodiment, the communication link (APML) 102 includes clock, data, and an alert signal line. The alert signal line allows the processor to signal to the management controller of the occurrence of an event. The link 102 may be a point-to-point link between the management controller 101 and the processor 103. The link may be an SMBus or other appropriate communication link and may run at various frequencies, e.g., 100 KHz 400 KHz, 3.4 Wiz, or other clock frequency suitable for the particular application. The communication link 102 is used to supply the APM L hardware with commands and data and to retrieve data associated with the command, e.g., as a result of a read operation, and provide that data to the management controller 101. Note that the term sideband interface is used to contrast to other processor communication links and their interfaces on the processor, such as memory link 222, which couples processor to memory, and I/O link 224, which couples the processor to input/output devices over, e.g., a Hypertransport (HT) communications link. Note that while a single memory link 222 and I/O link 224 is shown in FIG. 2 for processor 103, each core 203 may have its own memory and I/O link. Further, while multiple cores are shown in FIG. 2, the embodiments described herein are applicable to processors with one or more cores. Additionally, while the microcode engine 207 is shown as being used by all the cores in FIG. 2, in some embodiments each core 203 may interface with the APML hardware 105 directly and use its own microcode engine, at least to support some of the APML commands.

The management controller 101 may be coupled through a network interface card (NIC) 215 to network 217 and through network 217 to an administrator 219. The administrator can provide the management controller 101 with information related to management of processor 103 and system 107 through the network.

The processor 103 includes three address pins 221 that allow the link 102 to select up to eight different processors on a single APML bus segment.

FIG. 2 also shows debug interface 209 coupled to a debug application 231, through a debug bus 233, which may be implemented as a JTAG bus with additional signal lines debug request (DBReq) and debug ready (DBRdy). Such an interface is known in the art and implemented, e.g., by Advanced Micro Devices Hardware Debug Tool (HDT).

Figure 3:
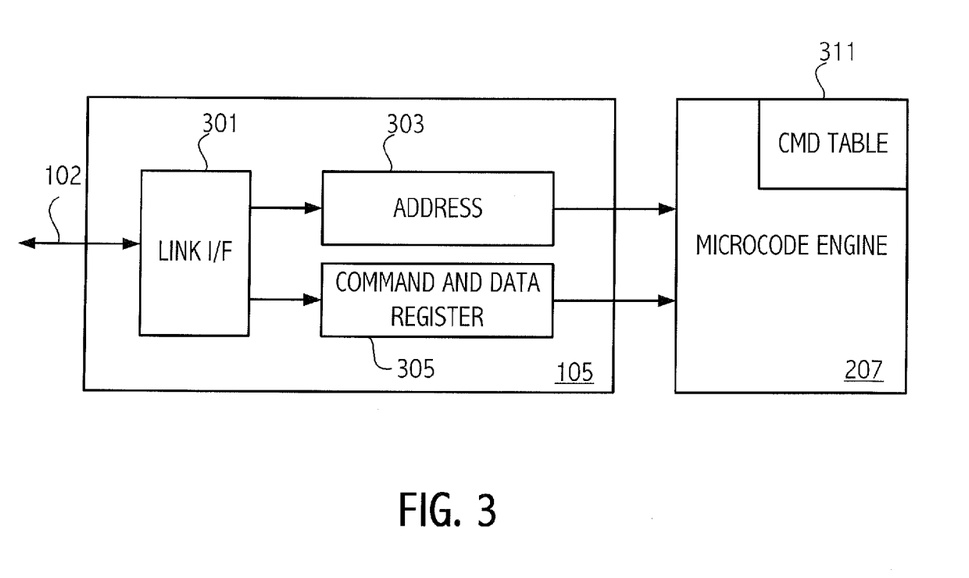
FIG. 3 illustrates additional details of the Advanced Platform Management Link (APML) block of FIG. 2.

Referring to FIG. 3, additional details of the APML block 105 are shown. APML block 105 includes a link interface 301 that implements the protocol necessary to communicate over the link 102. In addition, APML block 105 includes an address register 303 and a command and data register 305. The address register 303 stores address information sent over the link 102. The command and data register 305 stores command information and data, if appropriate for the particular command, e.g., data associated with a write command. In addition, the command and data register receives data from the microcode engine in response to an executed command, e.g., data read from a particular location in the processor or external to the processor.

The microcode engine 207 receives the commands from the APML block 105 and executes those commands while the microprocessor maintains normal operation. The microcode engine, which is conventional, executes the APML commands at appropriate instruction boundaries of regular instructions executed by the microprocessor. The APML commands function similarly to an interrupt mechanism in that the normal flow of microprocessor instructions is halted briefly while the microcode executes the APML command and then the normal microprocessor instructions resume execution at the conclusion of the APML command. In an embodiment, execution of APML commands may be accomplished by interrupting normal operation and freezing processor operation to allow execution of APML commands. That approach is, of course, not realistic in a runtime environment.

Because the APML interface provides access to machine registers, use of the interface may have security implications. Accordingly, in one embodiment, referring now to FIG. 4, the APML interface is divided into multiple interface portions, the thermal sensor interface (TSI) 401, the remote management interface (RMI) 403, and the internal access interface (IAI) 405, which provide access to different registers and information in the processor. The thermal sensor interface (TSI) 401 allows accessing processor thermal information. Thus, digital temperature information from thermal sensors on-board (or accessible to) the processor is available through this interface. The RMI 403 is a public interface to such information as processor power state limit, machine check registers, and CPUID that allows for platform and/or processor management functions to access information relating to such attributes as performance and power consumption. Other types of information may also be accessible through the RMI that allow appropriate management of the processor/platform functions. APML TSI and RMI expose processor temperature and basic manageability information which are not considered a violation of secure mode processor operation. Thus, the access provided through both the TSI 401 and the RMI 403 allows access to portions of the processor state information that do not have security implications, at least with respect to secure mode processor operations.

Figure 4:
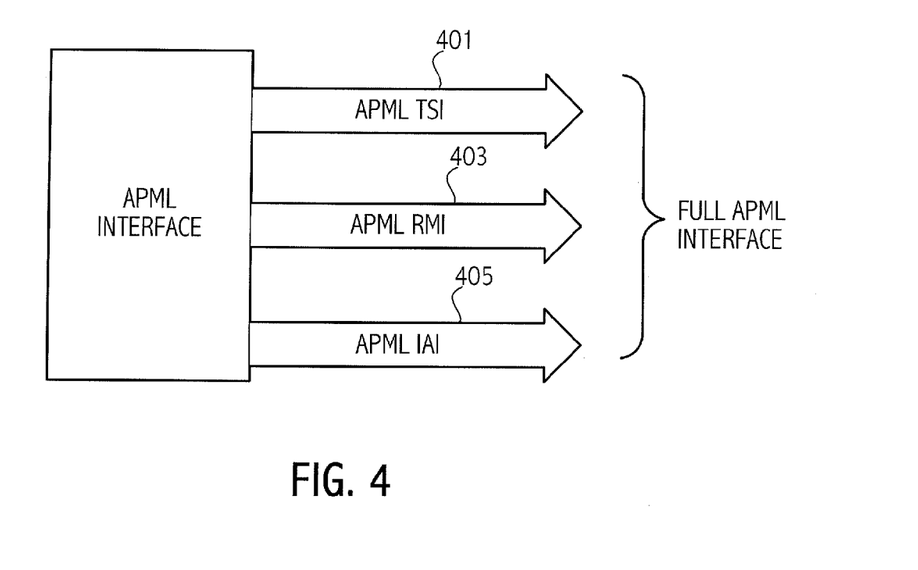
FIG. 4 illustrates multiple interface portions of an exemplary APML interface.

In contrast, the IAI provides access to low level processor and platform state information. For example, in an exemplary embodiment, the IAI provides access to such low level processor and platform state information as general purpose registers, various special purpose registers, machine specific registers (MSRs), various input/output (I/O) including I/O devices, and memory. Of course any particular embodiment may provide access to additional and/or different low level processor and platform state information. The IAI allows bypassing operating system and hypervisor security mechanisms such as process isolation, access control, user authentication, and hardware and software resource management. Thus, access through the IAI has security implications. Accordingly, various security policies may be utilized in conjunction with the IAI. In an embodiment of the invention, the IAI access is configured in a way that allows software, such as trusted software 109, to make policy based decisions to enable or disable processor sideband interfaces in order to foster a proper security model. That allows the sideband interfaces such as the APML interface to perform advanced manageability and reliability, accessibility and serviceability (RAS) functionality during software runtime. Otherwise, sideband interfaces would have to be permanently turned off during run time in order to maintain a proper security model.

Figure 5:
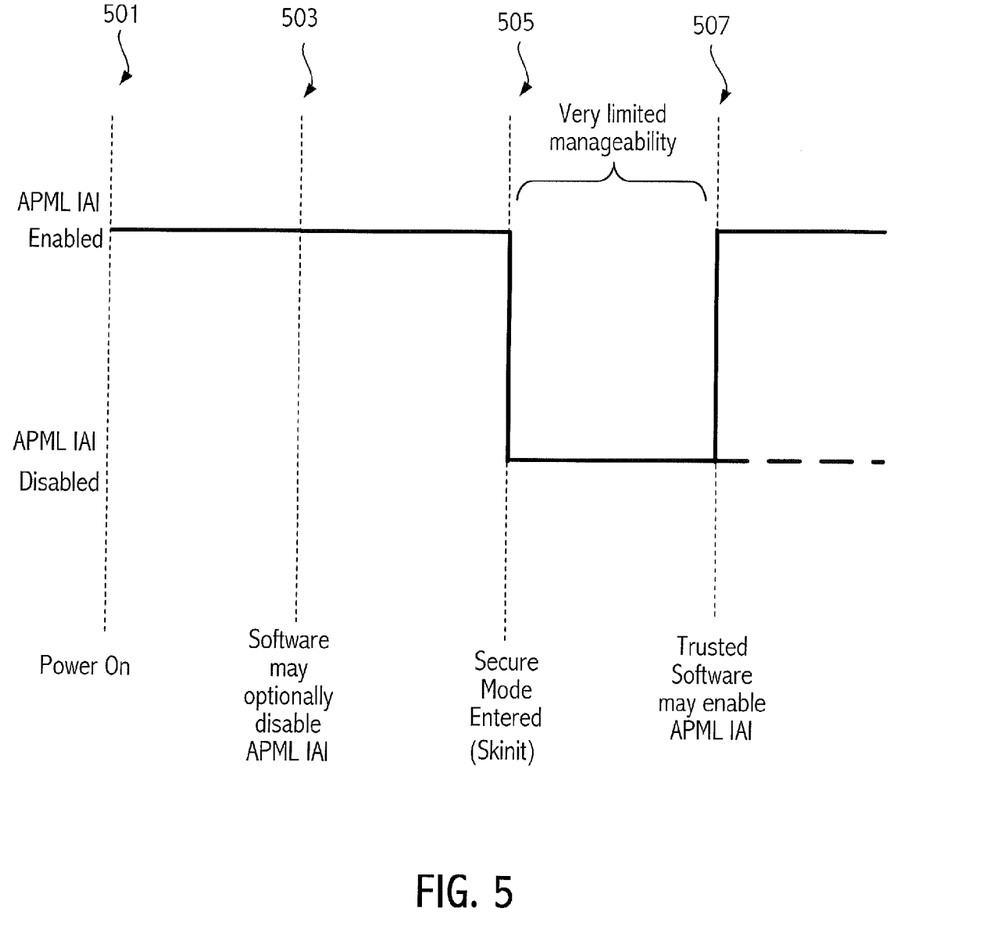
FIG. 5 illustrates the enablement life cycle for the internal access interface (IAI) interface portion of the APML.

Referring to FIG. 5, illustrated is the enablement life cycle for the IAI interface portion of the APML. On power-on at 501 the APML IAI interface is enabled. Typically, a power-on reset signal will be generated on power-on and the APML IAI will be enabled in accordance with that power-on reset. Other mechanisms to ensure that the APML IAI is enabled on power-on may also be implemented. If sideband interfaces, including the APML, did not wake up on power-on enabled, the ability to debug the processor may be impacted. Accordingly, all the APML interfaces (IAI, TSI, and RMI) are enabled on power-on. After power-on at 503, for example during system, initialization, software such as basic input/output system (BIOS) may optionally disable APML IAI. In one embodiment, the TSI and RMI interface portions always remain enabled because the information available through those interfaces does not present adverse security implications. In other embodiments, those interface portions may also be turned off by trusted software.

At 505 a secure mode is entered. In an embodiment, the computer system includes a processor that is capable of executing a security initialization instruction. The security initialization instruction places the processor in a trusted execution environment in which a security kernel can execute that is free from external tampering. The security initialization instruction causes the processor to turn off debug ports, blocks interrupts including system management interrupts (SMIs), as well as causing other security related operations to initiate. While in the trusted execution environment, the state of the platform can be measured. Additional information on a security initialization instruction and a processor capable of executing in a secure execution mode can be found in U.S. Pub. No. 2004/0210764 A1, filed Apr. 18, 2003, naming McGrath et al. as inventors, which application is incorporated herein by reference in its entirety.

On entering the secure mode at 505, the IAI interface portion, which has access to machine state and is therefore a security risk as described earlier, is turned off. That is, in response to executing the secure initialization instruction, hardware may turn off the IAI interface portion. However, the other portions of the APML interface, namely the RMI and the TSI, are left enabled on entering the secure mode, since the access they provide does not have the same security implications. Between 505 and 507, limited platform manageability is provided by the other portions of the APML interface that remain enabled. Once the processor/platform is in a known good state, the trusted software can choose to enable the IAI at 507. Alternatively, depending on the security policy in place, the security policy engine 111 of the trusted software 109 may choose to leave the IAI disabled at 507 and enable the interface at a later time or according to the security policy in place.

Figure 6:
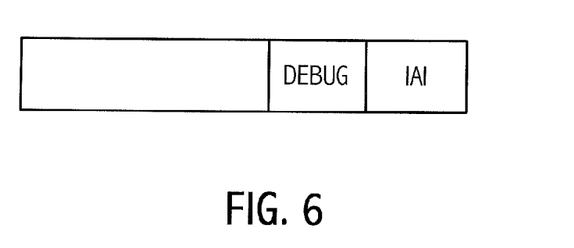
FIG. 6 illustrates an exemplary control register for controlling sideband interfaces.

The IAI interface may be turned on and off by setting a control bit in a hardware control register. That value of the bit may be controlled by software, e.g., before 505 and at 507. Further, the power-on reset may cause the value of that bit to be set to enable the IAI. Also, execution of the secure initialization instruction may cause the bit to be reset to disable the IAI. Thus, the bit may be controlled by both hardware and software. An exemplary control register is shown in FIG. 6. The IAI and the debug interface may have separate enable bits as shown or they may both be controlled by a single control bit.

In another embodiment, rather than have execution of the secure initialization instruction disable the IAI and prevent access to processor state information available through the IAI, a more granular approach to controlling access to the processor may be provided. That is, trusted system software can use various control bits to enable/disable types of processor (or system) state information that a sideband interface can access. For example, a control bit can determine read and/or write access to model specific registers (MSRs). Thus, e.g., one control bit controls read access to MSRs 0000_0000h through 0000_FFFFh. Another control bit controls write access to MSRs in the same range. Similarly, control bits can enable reads and/or writes to specific memory address ranges. Additional control bits can be used to provide access to registers within the system and system I/O. Thus, access can be provided with as much granularity as desired in a particular system.

Control bits can be aggregated to provide higher level control for processor state access. Thus, execution of the secure initialization instruction, rather than disabling access to the fixed processor state information associated with the IAI interface, disables access to information determined by a predetermined aggregate of the control bits representing various portions of processor state. In an embodiment the processor state information that is available through the IAI interface is programmable. The state information that is available can, e.g., be specified by software after secure mode is entered. The software may be from a source such as secure flash memory, and the state information made available can be as a result of an analysis of current system state and appropriate security policy based decisions. In an embodiment, software can specify, after execution of the secure initialization instruction, those control bits that are disabled by execution of the secure initialization instruction. In another embodiment, software can dynamically specify, prior to execution of the secure initialization instruction, what state information is available through the IAI information, e.g., by specifying those control bits that are disabled by execution of the secure initialization instruction. Alternatively, fuses can be used to permanently set the state information that is available through the IAI interface. For example, fuses can select those control bits that are disabled on execution of the secure initialization instruction or the information can be hardwired in the design. In an embodiment, the various processor register and memory locations that are associated with various of the APML interface portions may also be programmable. Thus, particular temperature registers can be assigned to the TSI and certain processor registers, machine-specific registers (MSRs), and memory locations may be assigned to the IAI.

Referring back to FIG. 3, the microcode engine includes a command table 311 stored in non-volatile memory. In an embodiment, the command table 311 stores commands that that can be run when the IAI is turned off. Thus, if the command is not in the table, the command is not run. The value of the control bit can determine whether to check the table and thus, whether or not IAI commands can be run. Thus, while TSI command and RMI commands are allowed, IAI commands giving access to, e.g., general purpose machine registers, I/O, memory, etc., are disabled. Note that the command and data register 305 and address register 303 may be used to load commands (and addresses) for all of the APML interfaces commands. However, once the IAI is disabled, its commands are not executed even if supplied to the microcode engine. While the command table 311 described above is one way to disable IAI commands, many other mechanisms can be used to ensure that the commands issued from the IAI are not executed, including having unique decode strings for IAI commands that prevent the microcode engine from becoming aware of the command register having been loaded. In addition, where multiple control bits are used to determined what processor information is accessible, tables can be used in which entries are associated with control bits, the entries including processor information such as registers, groups of registers, memory blocks, I/O, the type of access (e.g., read and/or write) that are accessible when the associated control bit is at the appropriate value. Many other approaches can be used to selectively enable access to information.

The description of the invention set forth herein is illustrative, and is not intended to limit the scope of the invention as set forth in the following claims. Other variations and modifications of the embodiments disclosed herein may be made based on the description set forth herein, without departing from the scope and spirit of the invention as set forth in the following claims.

What is claimed is:

1. A method comprising:
   enabling access to first predetermined processor information including low level processor state information through a sideband interface in response to a power-on reset in a processor; and
   responsive to entering a secure mode in the processor after the power-on reset, disabling access to the first predetermined processor information through the sideband interface, while maintaining accessibility to second predetermined processor information through the sideband interface, the second predetermined processor information including information related to temperature.

2. The method as recited in claim 1 further comprising responsive to entering the secure mode in the processor, disabling a first interface portion of the sideband interface providing access to the first predetermined processor information, while maintaining access through a second interface portion of the sideband interface to the second predetermined processor information.

3. The method as recited in claim 2 further comprising enabling the first interface portion of the sideband interface in response to the power-on reset.

4. The method as recited in claim 3 further comprising selectively enabling, under trusted software control, the first interface portion of the sideband interface while in the secure mode.

5. The method as recited in claim 3, further comprising software selectively disabling the first interface portion prior to entering the secure mode and after the power-on reset.

6. The method as recited in claim 2 further comprising maintaining the second interface portion enabled, thereby providing access to the second predetermined processor information, by allowing one or more registers containing temperature related information to be read over the sideband interface.

7. The method as recited in claim 2 further comprising maintaining at least a third interface portion of the sideband interface enabled while the first interface portion is disabled.

8. The method as recited in claim 7 further comprising maintaining the third interface portion of the sideband interface enabled by allowing one or more registers containing power management related information to be read over the sideband interface in response to a command received over the sideband interface.

9. The method as recited in claim 7 further comprising maintaining the third interface portion of the sideband interface enabled by allowing at least one machine check register to be read over the sideband interface in response to a command received over the sideband interface.

10. The method as recited in claim 2 wherein entering the secure mode is responsive to execution of a secure initialization instruction and the first interface portion is disabled as part of the execution of the secure initialization instruction.

11. The method as recited in claim 2 wherein the first interface portion provides access to system state information in response to commands received over the sideband interface.

12. The method as recited in claim 2 further comprising software specifying, prior to entering the secure mode, the first predetermined processor information accessible through the first interface portion of the sideband interface.

13. A processor comprising:
   a sideband interface;
   wherein the processor is configured to provide access to first predetermined processor information including processor state information through the sideband interface in response to a power-on reset and to provide access to second predetermined processor information, including temperature information, through the sideband interface in response to the power-on reset; and
   wherein the processor is configured, responsive to entering a secure mode after the power-on reset, to disable access to the first predetermined processor information through the sideband interface, while maintaining access to second predetermined processor information through the sideband interface.

14. The processor as recited in claim 13 wherein the sideband interface includes a plurality of interface portions including at least a first and a second interface portion, the first interface portion providing access to the first predetermined processor information and the second interface portion providing access to the second predetermined processor information.

15. The processor as recited in claim 14,
   wherein the first interface portion is configured to be enabled in response to the power-on reset of the processor, and disabled in response to entering the secure mode; and
   wherein the second interface portion of the sideband interface is configured to remain enabled in response to entering the secure mode.

16. The processor as recited in claim 15 wherein entering the secure mode is execution of a secure initialization instruction, and the first interface portion is disabled in response to the execution of the instruction.

17. The processor as recited in claim 15 wherein the first interface portion is disabled by preventing execution of commands received over the sideband interface for the first interface portion.

18. The processor as recited in claim 15 wherein the first interface portion of the sideband interface provides access to system memory and processor machine state registers in response to respective commands received over the sideband interface when the first interface portion is enabled.

19. The processor as recited in claim 15 wherein the first interface portion provides access to processor input/output (I/O).

20. The processor as recited in claim 15, further comprising a control register having one or more programmable bits whose value determines whether the first portion is enabled or disabled.

21. The processor as recited in claim 15 further comprising at least a third interface portion of the sideband interface, the third interface portion enabled while the first interface portion is disabled, wherein the third interface portion is configured to allow one or more registers containing at least one of power management related information and a machine check register to be read over the sideband interface in response to a command received over the sideband interface.

22. The processor as recited in claim 13 wherein the state information that is included in of the first predetermined processor information is software programmable after the secure mode is entered.

* * * * *